US011158035B2

(12) United States Patent
Liu (10) Patent No.: US 11,158,035 B2
(45) Date of Patent: Oct. 26, 2021

(54) METHOD AND APPARATUS FOR ACQUIRING QUEUING INFORMATION, AND COMPUTER-READABLE STORAGE MEDIUM THEREOF

(71) Applicant: HANGZHOU HIKVISION DIGITAL TECHNOLOGY CO., LTD., Zhejiang (CN)

(72) Inventor: Lin Liu, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 110 days.

(21) Appl. No.: 16/563,632

(22) Filed: Sep. 6, 2019

(65) Prior Publication Data
US 2019/0392572 A1    Dec. 26, 2019

Related U.S. Application Data

(63) Continuation of application No. PCT/CN2018/078126, filed on Mar. 6, 2018.

(30) Foreign Application Priority Data

Mar. 7, 2017  (CN) .......................... 201710130666.2

(51) Int. Cl.
G06T 7/20    (2017.01)
G06T 7/00    (2017.01)
G06T 7/70    (2017.01)

(52) U.S. Cl.
CPC .............. G06T 7/0002 (2013.01); G06T 7/20 (2013.01); G06T 7/70 (2017.01);
(Continued)

(58) Field of Classification Search
CPC ........... G06T 7/0002; G06T 7/70; G06T 7/20; G06T 2207/10028; G06T 2207/30196;
(Continued)

(56) References Cited

U.S. PATENT DOCUMENTS

2007/0253595 A1    11/2007  Sorensen
2009/0034846 A1*   2/2009   Senior ................ G06K 9/00778
                                              382/190
2016/0191865 A1*   6/2016   Beiser ................ G06K 9/00778
                                              348/156

FOREIGN PATENT DOCUMENTS

CN    102855760 A    1/2013
CN    102867414 A    1/2013
(Continued)

OTHER PUBLICATIONS

Patino et al., "Abnormal behaviour detection on queue analysis from stereo cameras", 2015 12TH IEEE International Conference on Advanced Video and Signal Based Surveillance (AVSS), IEEE, Aug. 25, 2015 (Aug. 25, 2015), pp. 1-6, entire document.
(Continued)

*Primary Examiner* — Matthew C Bella
*Assistant Examiner* — Kathleen M Broughton
(74) *Attorney, Agent, or Firm* — Knobbe, Martens, Olson & Bear, LLP (57) ABSTRACT

A method for acquiring queuing information includes: acquiring a location and a height of each pixel point in a first video image in a world coordinate system, wherein the first video image is a video image captured by a video camera at a queue area; determining a behavior state of each human body at the area based on the location and the height of each pixel point; and acquiring queuing information based on the behavior state of each human body at the area at a current time.

20 Claims, 4 Drawing Sheets

(52) U.S. Cl.
CPC ............... *G06T 2207/10028* (2013.01); *G06T 2207/30196* (2013.01); *G06T 2207/30242* (2013.01)

(58) Field of Classification Search
CPC ...... G06T 2207/30242; G06K 9/00771; G06K 9/00; G06K 9/00342; G06K 9/00718; G06K 9/00778
See application file for complete search history.

(56) References Cited

FOREIGN PATENT DOCUMENTS

| | | | | |
|---|---|---|---|---|
| CN | 103903445 | A | * | 7/2014 |
| CN | 103903445 | A | | 7/2014 |
| CN | 103916641 | A | | 7/2014 |
| CN | 103942773 | A | * | 7/2014 |
| CN | 103942773 | A | | 7/2014 |
| CN | 104215237 | A | | 12/2014 |
| CN | 104994360 | A | * | 10/2015 ............. G06T 7/277 |
| CN | 104994360 | A1 | | 10/2015 |
| JP | 3727798 | B2 | * | 12/2005 |
| JP | 2009193412 | A | | 8/2009 |

OTHER PUBLICATIONS

Extended European search report of counterpart EP application No. 18763346.6 dated Feb. 24, 2020.
International search report of PCT application No. PCT/CN2018/078126 dated Apr. 26, 2018 in 18 pages.
First office action of Chinese application No. 201710130666.2 dated Apr. 16, 2019 in 12 pages.

* cited by examiner

FIG. 4

METHOD AND APPARATUS FOR ACQUIRING QUEUING INFORMATION, AND COMPUTER-READABLE STORAGE MEDIUM THEREOF

CROSS-REFERENCE TO RELATED APPLICATIONS

This disclosure is a continuation of international application No.: PCT/CN2018/078126 filed on Mar. 6, 2018, which claims priority to Chinese Patent Application No.: 201710130666.2, filed on Mar. 7, 2017 and entitled "METHOD AND APPARATUS FOR ACQUIRING QUEUING INFORMATION", the entire contents of each of the above-recited applications are hereby incorporated herein by reference.

TECHNICAL FIELD

The present disclosure relates to the technical field of video surveillance, and in particular, relates to a method and apparatus for acquiring queuing information, and a computer-readable storage medium thereof.

BACKGROUND

Queuing often happens at supermarket checkout, scenic ticket office, service hall, or the like nowadays. A manager may acquire queuing information. The queuing information may include the number of queuing people, and the like. The manager may adjust the number of service windows, or evaluate work efficiency or the like of a clerk based on the queuing information.

SUMMARY

The present disclosure provides a method and apparatus for acquiring queuing information, and a computer-readable storage medium.

In an aspect, there is provided a method for acquiring queuing information, comprising:

acquiring a location and a height of each pixel point in a first video image in a world coordinate system wherein the first video image is a video image captured by a video camera at a queue area;

determining a behavior state of each human body at the area based on the location and the height of the each pixel point; and acquiring queuing information based on the behavior state of each human body at the area at a current time.

Optionally, determining a behavior state of each human body at the area based on the location and the height of the each pixel point comprises:

acquiring a location of each human body at the area at the current time based on the location and the height of the each pixel point; and determining the behavior state of each human body at the area at the current time based on a location of each human body at the area at a first time and the location of each human body at the area at the current time, the first time being prior to the current time and away from the current time by a predetermined time threshold.

Optionally, acquiring a location and a height of each pixel point in a first video image in a world coordinate system comprises:

acquiring the first video image captured by the video camera; and based on coordinates of each pixel point in the first video image in an image coordinate system, acquiring the location and the height of each pixel point in the world coordinate system by a predetermined transform matrix.

Optionally, acquiring a location of each human body at the area at a current time based on the location and the height of the each pixel point comprises:

acquiring a depth image corresponding to the first video image based on the height of each pixel point in the first video image;

identifying, in the depth image, a location of a head image of each human body in the depth image in the image coordinate system; and based on the location of the head image of each human body in the image coordinate system, acquiring the location of the human body corresponding to the head image of each human body at the area at the current time by a predetermined transform matrix.

Optionally, acquiring a depth image corresponding to the first video image based on the height of each pixel point in the first video image comprises:

replacing a pixel value of each pixel point in the first video image with the height of the each pixel point respectively to obtain the depth image; or based on the location of each pixel point in the first video image, filling the height of the each pixel point in the first video image in a blank image to obtain the depth image.

Optionally, determining the behavior state of each human body at the area at the current time based on a location of each human body at the area at a first time and the location of each human body at the area at the current time comprises:

calculating a movement speed of each human body at the area at the current time based on the location of each human body at the area at the first time, the location of each human body at the area at the current time, and a time interval between the first time and the current time; and setting a behavior state of the human body with the movement speed exceeding a predetermined speed threshold as a traveling state, and setting a behavior state of the human body with the movement speed not exceeding the predetermined speed threshold as a queuing state.

Optionally, acquiring queuing information based on the behavior state of each human body at the area comprises:

based on the location of each human body in a queue set, determining a queue region of each human body in the queue set at the area at the current time, the queue set comprising human bodies in the queuing state at the area at the current time; and acquiring the queuing information at the area at the current time based on the determined queue region.

Optionally, upon acquiring a location and a height of each pixel point in a first video image in a world coordinate system, the method further comprises:

determining a region occupied by each human body at the area at the current time based on the location and the height of each pixel point; and prior to the determining a queue region of each human body in the queue set at the area at the current time, the method further comprises:

determining at least one queue region at the area at the current time based on the region occupied by each human body at the area at the current time.

Optionally, determining at least one queue region at the area at the current time based on the region occupied by each human body at the area at the current time comprises:

increasing a weight corresponding to the region occupied by each human body in the queuing state, and decreasing weights of other regions;

selecting a region with the weight exceeding a predetermined weight threshold from the regions at the area; and determining at least one connected region in the selected region, wherein each of the at least one connected region is a queue region.

Optionally, prior to determining a queue region, where each human body is located, in the queue set at the area at the current time, the method further comprises:

determining a first human body and a queue region where the first human body is located at the first time, wherein a behavior state of the first human body at the current time is the traveling state and a behavior state of the first human body at the first time is the queuing state; and modifying the behavior state of the first human body to the queuing state and adding the behavior state of the first human body to the queue set, if a location of the first human body at the current time is in the determined queue region.

Optionally, upon determining a behavior state of each human body at the area based on the location and the height of the each pixel point, the method further comprises:

determining the behavior state at the first time as the queuing state and determining a human body that does not appear at the area at the current time as a human body that disappears exceptionally, and adding the human body that disappears exceptionally to a queue human bodies that disappear; and acquiring the queuing information at the area at the current time based on the determined queue region comprises:

counting a number of first human bodies in the queue region;

counting the number of the human bodies that disappear exceptionally from the queue region in the queue of human bodies that disappear; and calculating a sum of the number of first human bodies and the number of the human bodies that disappear exceptionally to obtain the number of the queuing human bodies in the queue region.

Optionally, upon determining a behavior state of each human body at the area based on the location and the height of each pixel point, the method further comprises:

determining a human body that had the queuing state as the behavior state at the first time and does not appear at the area at the current time as a human body that disappears exceptionally, and adding the human body that disappears exceptionally to a queue of human bodies that disappear; and deleting the human body that disappears exceptionally from the queue of the human bodies that disappear if the queue of the human bodies that disappear comprises the human body that disappears exceptionally.

In another aspect, there is provided an apparatus for acquiring queuing information, comprising:

at least one processor; and at least one memory;

wherein the at least one memory stores one or a plurality of programs, the one or plurality of programs is configured to be executed by the at least one processor, to execute following instructions:

acquiring a location and a height of each pixel point in a first video image in a world coordinate system wherein the first video image is a video image captured by a video camera at a queue area;

determining a behavior state of each human body at the area based on the location and the height of the each pixel point; and acquiring queuing information based on the behavior state of each human body at the area at a current time.

In another aspect, there is provided an apparatus for acquiring queuing information, comprising:

at least one processor; and at least one memory;

wherein the at least one memory stores one or a plurality of programs, the one or plurality of programs is configured to be executed by the at least one processor, to execute instructions for performing any optional method in the above aspect.

In another aspect, there is provided a non-transitory computer-readable storage medium, wherein the non-transitory computer-readable storage medium is configured to store a computer program and the computer program is loaded by a processor to execute following instructions:

acquiring a location and a height of each pixel point in a first video image in a world coordinate system wherein the first video image is a video image captured by a video camera at a queue area;

determining a behavior state of each human body at the area based on the location and the height of the each pixel point; and acquiring queuing information based on the behavior state of each human body at the area at a current time.

In another aspect, there is provided a non-transitory computer-readable storage medium, wherein the non-transitory computer-readable storage medium is configured to store a computer program and the computer program is loaded by a processor to execute instructions for performing any optional method in the above aspect.

BRIEF DESCRIPTION OF THE DRAWINGS

FIG. 1-1 is a flowchart of a method for acquiring queuing information according to Embodiment 1 of the present disclosure;

FIG. 1-2 is a flowchart of another method for acquiring queuing information according to Embodiment 1 of the present disclosure;

FIG. 2-1 is a flowchart of a method for acquiring queuing information according to Embodiment 2 of the present disclosure;

FIG. 2-2 is a schematic diagram used for queue area according to Embodiment 2 of the present disclosure;

DETAILED DESCRIPTION

The embodiments of the present disclosure will be described in further detail with reference to the accompanying drawings, to present the objects, technical solutions, and advantages of the present disclosure more clearly.

The queuing information may be acquired specifically through: firstly defining a queue region, deploying a first video camera at the head of a queue in the queue region, and deploying a second video camera at the end of a queue in the queue region. The first video camera captures a first image for the queue region at the head of the queue, and the second video camera captures a second image for the queue region at the end of the queue. An image of each human body in the first image and an image of each human body in the second image are identified based on the predetermined human body characteristics, and a human body that simultaneously appears in the first image and the second image is determined to be a human body in a queuing state, and the queuing information is acquired based on the human body in the queuing state. For example, the number of queuing people may be obtained by counting the human bodies in the queuing state.

At present, two video cameras need to be deployed in each queue region, and the queuing information of the queue region may be acquired by these two video cameras. When a plurality of queue regions are defined, the number of the desired video cameras will multiply, and the cost will be increased.

Queuing often happens at supermarket checkout, scenic ticket office, service hall, or the like nowadays. As illustrated in any of the embodiments hereinafter, queuing information at the area may be acquired only by means of a video camera, and the cost may be lowered compared to the above manner. After the queuing information is acquired, the queuing information may also be sent to a manager's terminal, such that the manager may adjust the number of service windows, or evaluate work efficiency or the like of a clerk based on the queuing information.

Embodiment 1

Figure 11:
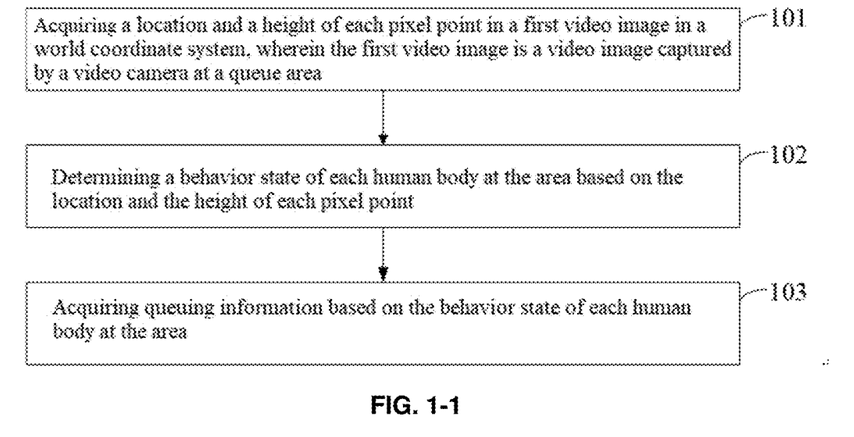

Referring to FIG. 1-1, an embodiment of the present disclosure provides a method for acquiring queuing information. The method includes the following steps:

In step 101, a location and a height of each pixel point in a first video image in a world coordinate system are acquired, wherein the first video image is a video image captured by a video camera at a queue area.

In step 102, a behavior state of each human body at the area is determined based on the location and the height of each pixel point.

In step 103, queuing information is acquired based on the behavior state of each human body at the area.

Figure 12:
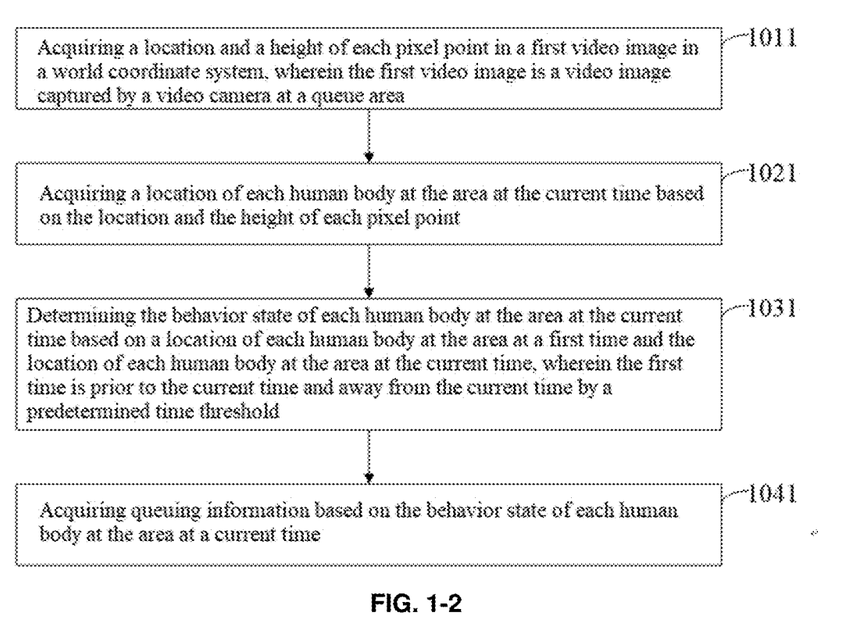

The process as illustrated in FIG. 1-1 may be implemented in a plurality of manners. For example, referring to FIG. 1-2, the present disclosure provides an implementation manner of the process as illustrated in FIG. 1-1. The implementation manner may include the following steps:

In step 1011, a location and a height of each pixel point in a first video image in a world coordinate system are acquired, wherein the first video image is a video image captured by a video camera at a queue area.

Specifically, the first video image captured by the video camera is acquired and based on coordinates of each pixel point in the first video image in an image coordinate system, the location and the height of each pixel point in the world coordinate system are acquired by a predetermined transform matrix.

The area may include one or a plurality of queue regions. That is, there may be one or a plurality of queues at the area. The video camera may capture images for all the queue regions at the area, or may capture images for some queue regions at the area. Those queue regions at the area may include one or a plurality of queue regions. Compared to the current solution where a video camera needs to be deployed at the head and the end of a queue respectively in each queue region, the embodiment of the present disclosure may reduce the number of video cameras, and thus lower the cost.

In step 1021, a location of each human body at the area at the current time is acquired based on the location and the height of each pixel point.

Specifically, a pixel value of each pixel point in the first video image is replaced with the height of the each pixel point to obtain a depth image; a location of a head image of each human body in the depth image in the image coordinate system is identified in the depth image; and based on the location of the head image of each human body in the image coordinate system, the location of the human body corresponding to the head image of each human body at the area at the current time is acquired by the predetermined transform matrix.

In step 1031, the behavior state of each human body at the area at the current time is determined based on a location of each human body at the area at a first time and the location of each human body at the area at the current time, wherein the first time is prior to the current time and away from the current time by a predetermined time threshold.

Specifically, a movement speed of each human body at the area at the current time is calculated based on the location of each human body at the area at the first time, the location of each human body at the area at the current time, and a time interval between the first time and the current time; and a behavior state of the human body with the movement speed exceeding a predetermined speed threshold is set as a traveling state, and a behavior state of the human body with the movement speed not exceeding the predetermined speed threshold is set as a queuing state.

In step 1041, queuing information is acquired based on the behavior state of each human body at the area at a current time.

The queuing information may include at least one of: the total number of the current queuing people, the number of the queue regions, the number of queuing people in each queue region, a location of the head of a queue, a location of the end of a queue, the number of queue jumpers, the number of queue leavers, or an average queue time.

In the embodiment of the present disclosure, the location and the height of each pixel point in the first video image captured by a video camera in the world coordinate system; the behavior state of each human body at the area may be determined based on the location and the height of the each pixel point; and the queuing information is acquired based on the behavior state of each human body. In this way, the queuing information may be acquired by deploying only one video camera at the entire area, and thus the cost is lowered.

Embodiment 2

Figure 21:
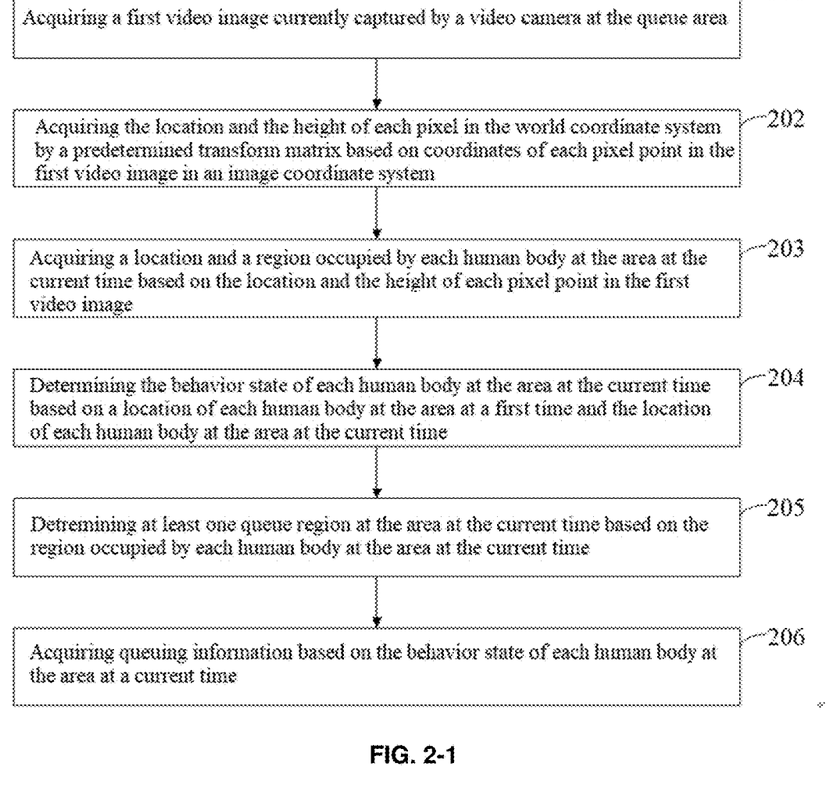

Referring to FIG. 2-1, an embodiment of the present disclosure provides a method for acquiring queuing information. The method includes the following steps:

In step 201, a first video image currently captured by a video camera at the queue area is acquired.

Figure 22:
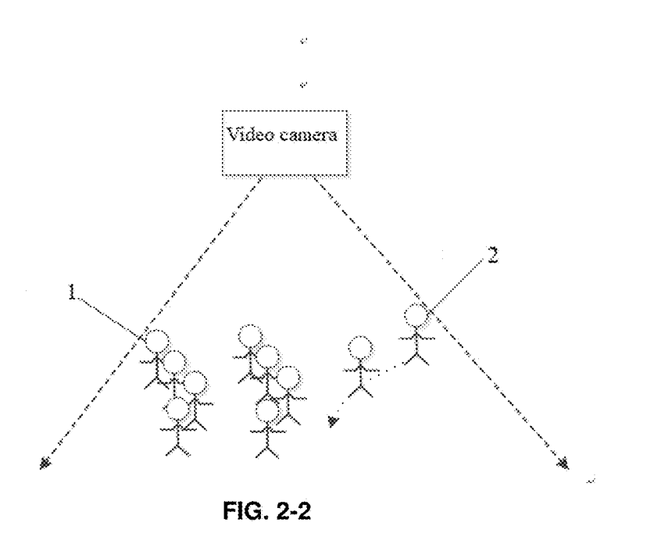

Referring to FIG. 2-2, a video camera may be deployed in advance at a ticket office or a checkout counter, or the like, and the video camera may be vertically or inclinedly mounted above a queue path at the area, such that the video camera may at least capture images for the queue regions, and may also capture images for the regions other than the queue regions at the area. That is, referring to FIG. 2-2, the video camera may not only capture the queuing human bodies 1 in the queue regions, but also traveling human bodies 2 outside the queue regions. The video camera may be a binocular video camera or a depth video camera or the like.

Optionally, the area may include one or a plurality of queue regions. That is, there may be one or a plurality of queues at the area. The deployed video camera may capture images for all the queue regions at the area, or may capture images for some queue regions at the area. Those queue regions at the area may include one or a plurality of queue regions.

The traveling human bodies refer to non-queuing people walking at the area.

In step 202, based on coordinates of each pixel point in the first video image in an image coordinate system, the location and the height of each pixel in the world coordinate system are acquired by a predetermined transform matrix.

The image coordinate system is a coordinate system of the first video image, and the world coordinate system is a coordinate system of the area.

A coordinate origin of the coordinate system of the first video image may be a point in the first video image, wherein a direction of a horizontal axis may be the same as the direction of the width of the first video image, and a direction of a longitudinal axis may be the same as direction of the length of the first video image.

A coordinate origin of the world coordinate system may be a projection point of the video camera on a horizonal ground, wherein a direction of a horizontal axis of the world coordinate system may be due east, a direction of a longitudinal axis may be normal, and a direction of a vertical axis may be perpendicular to the area.

The video camera for capturing the first video image may be a binocular video camera or a depth video camera. With different video cameras employed, the implementation manners of this step are different. Subsequently, the implementation manners when different video cameras are employed are described in detail hereinafter.

When a binocular video camera is employed, the predetermined transform matrix includes a first transform matrix and a second transform matrix, and this step may be as follows:

Firstly, based on the coordinates of each pixel point in the first video image in the image coordinate system, coordinates of each pixel point in the first video image in a camera coordinate system are calculated by formula (1):

$$\begin{pmatrix} x_a \\ y_a \\ z_a \\ 1 \end{pmatrix} = P \begin{pmatrix} x_b \\ y_b \\ z_b \\ 1 \end{pmatrix} \quad (1)$$

In formula (1), $x_a$, $y_a$ and $z_a$ respectively denote a horizontal coordinate, a longitudinal coordinate, and a binocular parallax of a pixel point in the image coordinate system, $x_b$, $y_b$ and $z_b$ respectively denote a horizontal coordinate, a longitudinal coordinate, and a vertical coordinate of the pixel point in the camera coordinate system, and P denotes a predetermined first transform matrix.

Then, based on the coordinates of each pixel point in the first video image in the camera coordinate system, the location and the height of each pixel point in the first video image in the world coordinate system are calculated by formula (2):

$$\begin{pmatrix} x_c \\ y_c \\ z_c \\ 1 \end{pmatrix} = M \begin{pmatrix} x_b \\ y_b \\ z_b \\ 1 \end{pmatrix} = MP \begin{pmatrix} x_a \\ y_a \\ z_a \\ 1 \end{pmatrix} \quad (2)$$

In formula (2), $x_c$, $y_c$ and $z_c$ respectively denote a horizontal coordinate, a longitudinal coordinate, and a height of a pixel point in the world coordinate system, $x_c$ and $y_c$ define a location of the pixel point in the world coordinate system, and M denotes a predetermined second transform matrix.

The binocular video camera captures images for the area and may obtain two video images, which are referred to as a first video image and a third video image, respectively, wherein each pixel point in the first video image corresponds to a pixel point in the third video image.

Optionally, a binocular parallax of each pixel point in the first video image may be calculated in advance based on the first video image and the third video image. The calculation of the binocular parallax may include:

reading a first column number of a first pixel point from the first video image, wherein the first pixel point is any one of the pixel points in the first video image; reading a second column number of a second pixel point corresponding to the first pixel point from the third video image; and subtracting the first column number from the second column number to obtain a difference, wherein the difference is a binocular parallax of the first pixel point. In this way, a binocular parallax of each pixel point in the first video image may be calculated in accordance with the above process.

When a depth video camera is employed, the predetermined transform matrix includes an internal parameter matrix and a rotation and translation matrix, and this step may be as follows:

Based on the coordinates of each pixel point in the first video image in the image coordinate system, the location and the height of each pixel point in the first video image in the world coordinate system are calculated by formula (3):

$$\begin{pmatrix} x_c \\ y_c \\ z_c \\ 1 \end{pmatrix} = CR \begin{pmatrix} x_a \\ y_a \\ 1 \end{pmatrix} \quad (3)$$

In formula (3), $x_a$ and $y_a$ respectively denote a horizontal coordinate and a longitudinal coordinate of a pixel point in the image coordinate system, $x_c$, $y_c$ and $z_c$ respectively denote a horizontal coordinate, a longitudinal coordinate and a height of a pixel point in the world coordinate system, $x_c$ and $y_c$ define a location of the pixel point in the world coordinate system, C denotes an internal parameter matrix, and R denotes a rotation and translation matrix.

It should be noted that each pixel point in the first video image may correspond to a physical point at the area, and therefore, the location of each pixel point in the first video image may be actually defined by a corresponding horizontal coordinate and a corresponding longitudinal coordinate of each corresponding physical point at the area.

In step 203, a location and a region occupied by each human body at the area at the current time are acquired based on the location and the height of each pixel point in the first video image.

The location of the human body may be a location of a point of the head of the human body at the area, and this location is defined by a horizontal coordinate and a longitudinal coordinate of this point in the world coordinate system. Optionally, this point may be a center point or any point or the like of the head of the human body.

This step may be performed by operations 2031 to 2033 as follows:

2031: A depth image corresponding to the first video image is acquired based on the height of each pixel point in the first video image.

Optionally, a pixel value of each pixel point in the first video image is replaced with the height of each pixel point to obtain the depth image.

Optionally, a blank image is generated, wherein an image coordinate system of the blank image is the same as the image coordinate system of the first video image; a horizontal coordinate and a longitudinal coordinate of a first pixel point are read from the first video image, wherein the first pixel point is any one of the pixel points in the first video image; and a height of the first pixel point is filled in the locations of the horizontal coordinate and the longitudinal coordinate of the generated blank image.

After the above operations are performed for each pixel point in the first video image, the generated image is the depth image corresponding to the first video image.

In this step, the height of each pixel point is substantially used as a depth value of each pixel point, and a depth image is defined.

2032: A location and an occupied region of a head image of each human body in the depth image in the image coordinate system are identified in the depth image.

The head of the human body is higher than other parts of the human body. In the depth image, a depth value of each pixel point in the head region is greater than that of each pixel point in the other surrounding regions. Based on this characteristic, a depth-value local maximal region may be extracted from the depth image, wherein the extracted local maximal region is the region where the head image is located in the image coordinate.

The location of the head image of the human body in the image coordinate system may be defined by a horizontal coordinate and a longitudinal coordinate of any one of the points in the head image of the human body in the image coordinate system; or the location of the head image of the human body in the image coordinate may be defined by a horizontal coordinate and a longitudinal coordinate of a center point of the head image of the human body in the image coordinate system.

2033: Based on the location and the region of the head image of each human body in the image coordinate system, the location and the occupied region of the human body corresponding to the head image of each human body at the area at the current time are acquired by the predetermined transform matrix.

When the binocular video camera is employed to capture the first video image, with respect to the head image of each human body, the location of the human body at the area is determined by formula (4) based on the location of the head image of the human body in the image coordinate system; wherein the horizontal coordinate $x_c$ and the longitudinal coordinate $y_c$ define the location of the human body at the area.

$$\begin{pmatrix} x_c \\ y_c \\ 1 \end{pmatrix} = M \begin{pmatrix} x_b \\ y_b \\ 1 \end{pmatrix} = MP \begin{pmatrix} x_a \\ y_a \\ 1 \end{pmatrix} \quad (4)$$

In formula (4), $x_c$ and $y_c$ respectively denote a horizontal coordinate and a longitudinal coordinate in the world coordinate system, $x_c$ and $y_c$ define a location of the human body in the world coordinate system, and $x_a$ and $y_a$ respectively denote a horizontal coordinate and a longitudinal coordinate in the image coordinate system, $x_a$ and $y_a$ define a location of the head image of the human body in the image coordinate, and $x_b$ and $y_b$ respectively denote a horizontal coordinate and a longitudinal coordinate in the camera coordinate system.

Optionally, based on the location of each pixel point in the head image of the human body in the image coordinate system, the location of the each pixel point at the area may be determined by formula (4), such that a region occupied by the head of the human body at the area is obtained; or based on the location of each pixel point at the edge of the head image of the human body in the image coordinate system, the location of the each pixel point at the place may be determined by formula (4), such that a region occupied by the head of the human body is obtained.

A region occupied by the head of a human body may be determined as a region occupied by the human body. Alternatively, a sub-region with a predetermined size may be expanded on the left side of the region and a sub-region with a predetermined size may be expanded on the right side of the region, and the expanded region may be determined as the region occupied by the human body.

When the depth video camera is employed to capture the first video image, with respect the head image of each human body, the location of the human body at the area is determined by formula (3) based on the location of the head image of the human body in the image coordinate system; wherein the horizontal coordinate $x_c$ and the longitudinal coordinate $y_c$ calculated by formula (3) define the location of the human body at the area.

Optionally, based on the location of each pixel point in the head image of the human body in the image coordinate system, the location of the each pixel point at the area may be determined by formula (3), such that a region occupied by the head of the human body at the area is obtained; or based on the location of each pixel point at the edge of the head image of the human body in the image coordinate system, the location of the each pixel point at the area may be determined by formula (3), such that a region occupied by the head of the human body is obtained.

A region occupied by the head of a human body may be determined as a region occupied by the human body. Alternatively, a sub-region with a predetermined size may be expanded on the left side of the region and a sub-region with a predetermined size may be expanded on the right side of the region, and the expanded region may be determined as the region occupied by the human body.

In step 204, the behavior state of each human body at the area at the current time is determined based on a location of each human body at the area at a first time and the location of each human body at the area at the current time.

The first time is prior to the current time and away from the current time by a predetermined time threshold. The first time may be a frame number or a time point of a video image. The first time may be a frame number of the second video image or the time for capturing the second video image. The second video image is a video image captured by the video camera prior to the current time, and the first video image and the second video image are spaced apart by N frames of video images, wherein N is an integer greater than or equal to 0.

The location of each human body at the area at the first time is acquired based on the second video image prior to the current time. The detailed acquisition process may be referenced to the operations in step 202 and step 203.

This step may include: calculating a movement speed of each human body at the area at the current time based on the location of each human body at the area at the first time, the location of each human body at the area at the current time, and a time interval between the first time and the current time; and setting a behavior state of the human body with the movement speed exceeding a predetermined speed threshold as a traveling state, and setting a behavior state of the human body with the movement speed not exceeding the predetermined speed threshold as a queuing state; and establishing the queue set with the human bodies in the queuing state.

Generally, the movement speed of the human bodies in the queuing state is usually relatively low, whereas the movement speed of the human bodies in the traveling state is usually relatively high, and a time interval between the first time and the current time is generally only several seconds or shorter, for example, the time interval may be 5 seconds, 3 seconds, 1 second, 0.5 second or the like. Therefore, in this step, a behavior state of the human body with the movement speed exceeding a predetermined speed threshold may be set as the traveling state, and a behavior state of the human body with the movement speed not exceeding the predetermined speed threshold may be set as the queuing state.

When human bodies are queuing, it is likely that a human body may travel across the queue. Generally, the movement speed of the human body is relatively high and exceeds the predetermined speed threshold. Therefore, the movement speed of each human body is calculated based on the location of each human body at the area at the first time and the location of each human body at the place at the current time, and the behavior state of the human body with the movement speed exceeding the predetermined speed threshold is set as the traveling state and this human body is not considered as a queuing human body, such that the behavior state of the human body traveling across the queue may not be set as the queuing state, and hence precision of acquiring the behavior state of the human body is improved.

In few cases, it is likely that a person may stand at the area but is generally not in the queue, that is, the person is not in the queue region, the movement speed of the person is constantly 0. In this step, this person is also probably judged to be in the queuing state.

It should be noted that errors that happen during the identification of the head image of the human body may result in the human bodies that disappear and appear exceptionally.

The human bodies that disappear exceptionally refer to the human bodies that are in the queuing state at the first time but fail to appear at the area at the current time. This may be because the head images of the human bodies are not identified during the identification of the head images of the human bodies at the current time.

The human bodies that appear exceptionally refer to the human bodies that are in the queuing state at the current time but fail to appear at the area at the first time. This may be caused when shoulders or other parts of other human bodies are mistakenly identified as the head images of the human bodies during the identification of the head images of the human bodies at the current time.

Optionally, in this step, the human bodies that disappear or appear exceptionally may also be identified. Its implementation may be as follows:

The behavior state at the first time is determined as the queuing state, and the human bodies that fail to appear at the area at the current time are determined as the human bodies that disappear exceptionally; if the queue of the human bodies that appear includes the human bodies that disappear exceptionally, the human bodies that disappear exceptionally are deleted from the queue of the human bodies that appear; otherwise, the human bodies that disappear exceptionally are added to the queue of the human bodies that disappear.

Wherein, the queue of the human bodies that appear includes the human bodies judged to appear exceptionally prior to this step. If the behavior state of a human body included in the queue of the human bodies that appear at the first time is the queuing state, it indicates that the human body is determined as a human body that appears exceptionally at the first time.

If the human body is determined as a human body that disappears exceptionally at the current time, it indicates that the determination is made because the shoulder or other parts of other human body is mistakenly identified as the head image of the human body at the first time. When the human body determined to disappear exceptionally at the current time appears in the queue of the human bodies that appear, the human body that disappears exceptionally does not need to be further judged subsequently, and may be directly deleted from the queue of the human bodies that disappear.

The behavior state at the current time is determined as the queuing state, and the human body that does not appear at the area at the first time is determined as a human body that appears exceptionally. If the queue of the human bodies that disappear includes the human body that appears exceptionally, the human body that appear exceptionally is deleted from the queue of human bodies that disappear; otherwise, the human body that appears exceptionally is added to the queue of the human bodies that appear, and deleted from the queue set.

If the human body included in the queue of the human bodies that disappear is determined as a human body that appears exceptionally at the current time, it indicates that the head image of the human body fails to be identified during the identification of the head images of the human bodies prior to the current time. As a result, the human body is determined as a human body that disappears exceptionally, and is added to the queue of the human bodies that disappear.

Therefore, when the human body is determined as the human body that appears exceptionally at the current time, the human body in the queue of human bodies that disappear does not need to be further judged, and may be directly deleted from the queue of the human bodies disappear.

In addition, a storage time during which each human body that disappears exceptionally in the queue of the human bodies that disappear is kept in the queue of the human bodies that disappear may be monitored, and the human body that disappears exceptionally with the storage time exceeding a predetermined storage time threshold may be deleted from the queue of the human bodies that disappear. The human body that disappears exceptionally with the storage time exceeding the predetermined storage time threshold may be a non-existing human body, and thus may be deleted from the queue of the human bodies that disappear, and the human body that disappears exceptionally may not be further tracked.

If the storage time of a human body that disappears exceptionally exceeds the predetermined storage time threshold, it indicates that the human body that disappears exceptionally may be a non-existing human body. In one of the judgements prior to this step, the shoulder or other parts of other human body may be mistakenly determined as the head image of the human body disappears exceptionally. Therefore, the human body that disappears exceptionally may be directly deleted from the queue of human bodies disappear.

In addition, a storage time during which each human body that appears exceptionally in the queue of the human bodies that appear is kept in the queue of the human bodies that appear exceptionally may also be monitored, the behavior state of the human body that appears exceptionally with the storage time exceeding a predetermined storage time threshold may be set as the queuing state, and the human body that appears exceptionally is moved from the queue of the human bodies that appear to the queue set.

With respect to the human body that appears exceptionally with the storage time exceeds the predetermines storage time threshold, it indicates that the human body that appears exceptionally may be due to a failure to identity the head image of the human body during an identification of the head images of the human bodies prior to this step, but may be successfully identified during each subsequent identification of the head images of the human bodies. Therefore, the behavior state of the human body that appears exceptionally with the storage time exceeding the predetermined storage time threshold may be set as the queuing state.

In step 205, at least one queue region at the area at the current time is determined based on the region occupied by each human body at the area at the current time.

Specifically, a weight corresponding to the region occupied by each human body in the queue set is increased at the area, and weights corresponding to the other regions except the region occupied by the each human body in the queue set are decreased at the area; a region with the weight exceeding a predetermined weight threshold is selected from the regions at the area; and at least one connected region in the selected region is determined, wherein each of the at least one connected region is a queue region.

Since the movement speed of the human body in the queuing state is low, the regions included in the queue region are always occupied by human bodies. As a result, the weight of each region in the queue region is continuously accumulated, and finally exceeds the predetermined weight threshold. The human bodies in a queue are generally close to each other. As a result, the regions occupied by two human bodies in the queuing state in the same queue region are connected. Therefore, one connected region may be taken as a queue region.

In this embodiment, the region with the weight exceeding the predetermined weight threshold is determined as the queue region. In this way, queue path may not need to be defined at the area in advance, and more flexible applications are achieved.

The human bodies queuing in the queue region may be found walking about. As a result, the behavior state of a human body is currently determined as the traveling state, but the actual behavior of the human body may still be the queuing state, and thus needs to be rectified as follows:

A first human body and a queue region that the first human body is in at the first time are determined, wherein a behavior state of the first human body at the current time is the traveling state and a behavior state of the first human body at the first time is the queuing state; and the behavior state of the first human body is modified to the queuing state and the behavior state of the first human body is added to the queue set, if a location of the first human body at the current time is in the determined queue region.

With respect to each queue region, the head and end of a queue of the queue region may also be determined as follows:

With respect to any queue region, a location of each human body in the queue region at the current time when it is in the queuing state for the first time is acquired, the number of human bodies corresponding to each location is counted, the location with the greatest number of human bodies is determined as the queue tail of the queue region, and the location of the end other than the queue tail of the queue region is determined as the queue head.

Queue jumpers may be present during the queuing, and the queue jumpers may jump the queue into a location other than the end of the queue. In this step, a queue jumper may be determined as follows: determining a human body whose behavior state at the first time is the traveling state and whose behavior state at the current time is the queuing state, and determining a queue region where the location of the human body is located at the current time, and determining that the human body is a queue jumper if the location of the human body at the current time is at the location other than the end of the queue of the queue region.

Queue leavers may also be present during the queuing, and the queue leavers may leave the queue from a location other than the head of the queue. In this step, a queue leaver may be determined as follows: determining a human body whose behavior state at the first time is the queuing state and whose behavior state at the current time is the traveling state, and determining a queue region where the location of the human body is located at the first time, and determining that the human body is a queue leaver if the location of the human body at the first time is at the location other than the head of the queue of the queue region.

Some human bodies may leave the queue from the queue head after completing their services. In this step, a human body leaving from the queue head may be determined as follows: determining a human body whose behavior state at the first time is the queuing state and whose behavior state at the current time is the traveling state, and determining a queue region where the location of the human body is located at the first time, and determining that the human body is a human body who leaves from the queue head if the location of the human body at the first time is the queue head location of the queue region.

In step 206, queuing information is acquired based on the behavior state of each human body at the area at a current time.

The queuing information may include at least one of: the total number of current queuing people, the number of the queue regions, the number of queuing people in each queue region, a location of the queue head, a location of the end of the queue, the number of queue jumpers, the number of queue leavers, or an average queuing time duration.

The total number of the current queuing people may be obtained by directly counting the total number of human bodies in the queuing state at the current time.

The number of queue regions may be obtained by directly counting determined queue regions.

With respect to the number of the queuing people in each queue region, the queue regions where each human body is located included in the queue set at the area at the current time may be determined based on the location of each human body in the queue set. With respect to each queue region, the number of first human bodies in the queue region is counted, the number of human bodies that disappear exceptionally from the queue region in the queues that disappear is counted, and a sum of the number of first human bodies and the number of human bodies that disappear exceptionally to obtain the number of queuing people in the queue region.

In few cases, a person may stand at the area but may not be in the queue region. Since the movement speed of the person is constantly 0, in step 204, this person may also be determined as a human body in the queuing state. Herein, based on the location of the human body, the human body at the area at the current time is determined not to pertain to any queue region. Therefore, the human body is not taken into the calculated number of first human bodies in the queue region, and thus precision of the calculation may be improved.

To improve the precision of the calculated total number of current queuing people, the number of queuing people in the queue regions may also be accumulated to obtain the total number of queuing people in the queue regions.

The number of queue jumpers may be obtained by directly counting the number of human bodies jumping the queue.

The number of queue leavers may be obtained by directly counting the number of human bodies leaving the queue.

With respect to the average queuing time duration, each human body leaving from the queue head is firstly determined, a time when the human body is initially in the queuing state and a time when the human body is last in the queuing state are acquired, a queuing time of the human body is calculated based on the time when the human body is initially in the queuing state and the time when the human body is last in the queuing state, and the average queuing time duration is calculated based on the queuing time when each human body leaves from the queue head.

If the time is a frame number, assuming that the time when the human body is initially in the queuing state is a frame number F1, and the time when the human body is last in in the queuing state is a frame number F2, then the queuing time of the human body is $$t = \frac{F2 - F1}{f}$$

seconds, wherein f denotes a frame rate at which the video camera captures videos.

In the embodiment of the present disclosure, the location and the height of each pixel in the first video image are captured by a video camera in the world coordinate system; the behavior state of each human body at the area is determined based on the location and the height of each pixel; the queuing information is acquired based on the behavior state of each human body. In this way, the queuing information may be acquired by deploying only one video camera at the entire area, and thus the cost is lowered. In addition, in this embodiment, the queue region is determined based on the region with the weight exceeding the predetermined weight threshold, such that the queue regions do not need to be defined in advance at the area, and thus more flexible applications are achieved; and during the process of acquiring the queuing information, predetermined human body characteristics are not needed, and the human bodies included at the area may be obtained only by identifying the head images of the human bodies from the depth image, such that operation complexity is lower compared to the related art.

Embodiment 3

Figure 3:
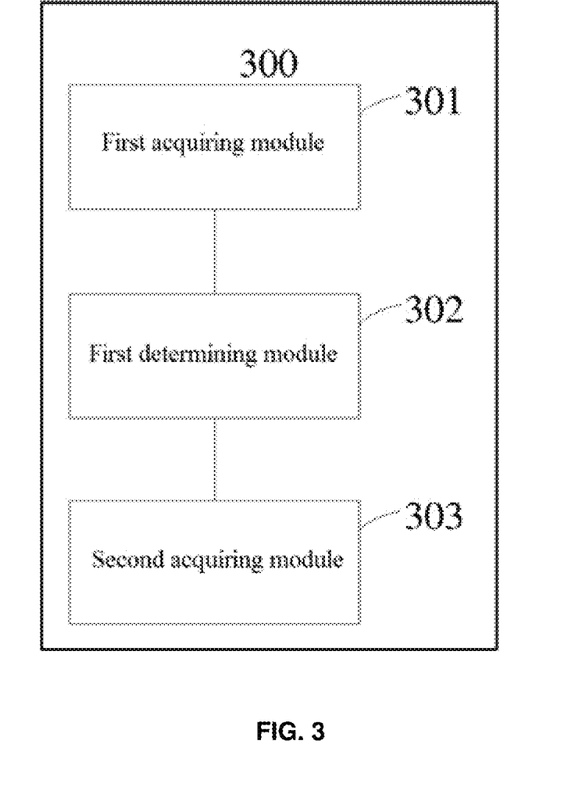
FIG. 3 is a schematic structural diagram of an apparatus for acquiring queuing information according to Embodiment 3 of the present disclosure.

Referring to FIG. 3, an embodiment of the present disclosure provides an apparatus 300 for acquiring queuing information. The apparatus 300 includes:

a first acquiring module 301, configured to acquire a location and a height of each pixel point in a first video image in a world coordinate system, wherein the first video image is a video image captured by a video camera at a queue area;

a first determining module 302, configured to determine a behavior state of each human body at the area based on the location and the height of each pixel point; and a second acquiring module 303, configured to acquire queuing information based on the behavior state of each human body at the area at a current time.

Optionally, the first determining module 302 includes:

a first acquiring unit, configured to acquire a location of each human body at the area at the current time based on the location and the height of each pixel point; and a first determining unit, configured to determine the behavior state of each human body at the place at the current time based on a location of each human body at the area at a first time and the location of each human body at the area at the current time, wherein the first time is prior to the current time and away from the current time by a predetermined time threshold.

Optionally, the first acquiring module 301 includes:

a second acquiring unit, configured to acquire the first video image captured by the video camera; and a third acquiring unit, configured to, based on coordinates of each pixel point in the first video image in an image coordinate system, acquire the location and height of each pixel point in the world coordinate system by a predetermined transform matrix.

Optionally, the first acquiring unit is further configured to:

acquire a depth image corresponding to the first video image based on the height of each pixel point in the first video image;

identify, from the depth image, a location of a head image of each human body in the depth image in the image coordinate system; and based on the location of the head image of each human body in the image coordinate system, acquire the location of the human body corresponding to the head image of each human body at the area at the current time by a predetermined transform matrix.

Optionally, the first acquiring unit is further configured to:

replace the pixel value of each pixel point in the first video image with the height of each pixel point to obtain the depth image; or based on the location of each pixel point in the first video image, fill the height of each pixel point in the first video image in a blank image to obtain the depth image.

Optionally, the first determining unit is further configured to:

calculate a movement speed of each human body at the area at the current time based on the location of each human body at the area at the first time, the location of each human body at the area at the current time, and a time interval between the first time and the current time; and set a behavior state of the human body with the movement speed exceeding a predetermined speed threshold as a traveling state, and set a behavior state of the human body with the movement speed not exceeding the predetermined speed threshold as a queuing state.

Optionally, the second acquiring module 303 includes:

a second determining unit, configured to, based on the location of each human body in a queue set, determine a queue region where each human body is located in the queue set at the area at the current time, wherein the queue set comprises human bodies in a queuing state at the area at the current time; and a fourth acquiring unit, configured to acquire the queuing information at the area at the current time based on the determined queue region.

Optionally, the second acquiring module 303 further includes:

a fifth acquiring unit, configured to determine a region occupied by each human body at the area at the current time based on the location and the height of each pixel point.

Optionally, the apparatus further includes:

a second determining module, configured to determine at least one queue region at the area at the current time based on the region occupied by each human body at the area at the current time.

Optionally, the second determining module includes:

an adjusting unit, configured to increase a weight corresponding to the region occupied by each human body in the queuing state, and decrease weights of other regions;

a selecting unit, configured to select a region with the weight exceeding a predetermined weight threshold from the regions at the area; and a second determining unit, configured to determine at least one connected region from the selected region, where each of the at least one connected region is a queue region.

Optionally, the apparatus further includes:

a modifying module, configured to: determine a first human body and a queue region where the first human body is located at the first time, wherein a behavior state of the first human body at the current time is the traveling state and a behavior state of the first human body at the first time is the queuing state; and modify the behavior state of the first human body to the queuing state and add the behavior state of the first human body to the queue set, if a location of the first human body at the current time is in the determined queue region.

Optionally, the apparatus further includes:

a third determining module, configured to determine the behavior state at the first time as the queuing state and determine a human body that does not appear at the area at the current time as an human body that disappears exceptionally, and add the human body that disappears exceptionally to a queue of human bodies that disappear;

wherein the fourth acquiring unit is configured to: count the number of first human bodies in the queue region; count the number of the human bodies that disappear exceptionally from the queue region in the queues of human bodies that disappear; and calculate a sum of the number of first human bodies and the number of human bodies that disappear exceptionally to obtain the number of queuing human bodies in the queue region.

Optionally, the apparatus further includes:

a fourth determining module, configured to: determine a human body that had the queuing state as the behavior state at the first time and does not appear at the area at the current time as a human body that disappears exceptionally, and adding the human body that disappears exceptionally to a queue of human bodies that disappear; and delete the human body that appears exceptionally in the queue of human bodies that disappear if the queue of human bodies that disappear comprises the human body that appears exceptionally.

In the embodiment of the present disclosure, the location and the height of each pixel in the first video image captured by a video camera in the world coordinate system; the behavior state of each human body at the area is determined based on the location and the height of each pixel; the queuing information may be acquired based on the behavior state of each human body. In this way, the queuing information may be acquired by deploying only one video camera at the entire area, and thus the cost is lowered.

Embodiment 4

Figure 4:
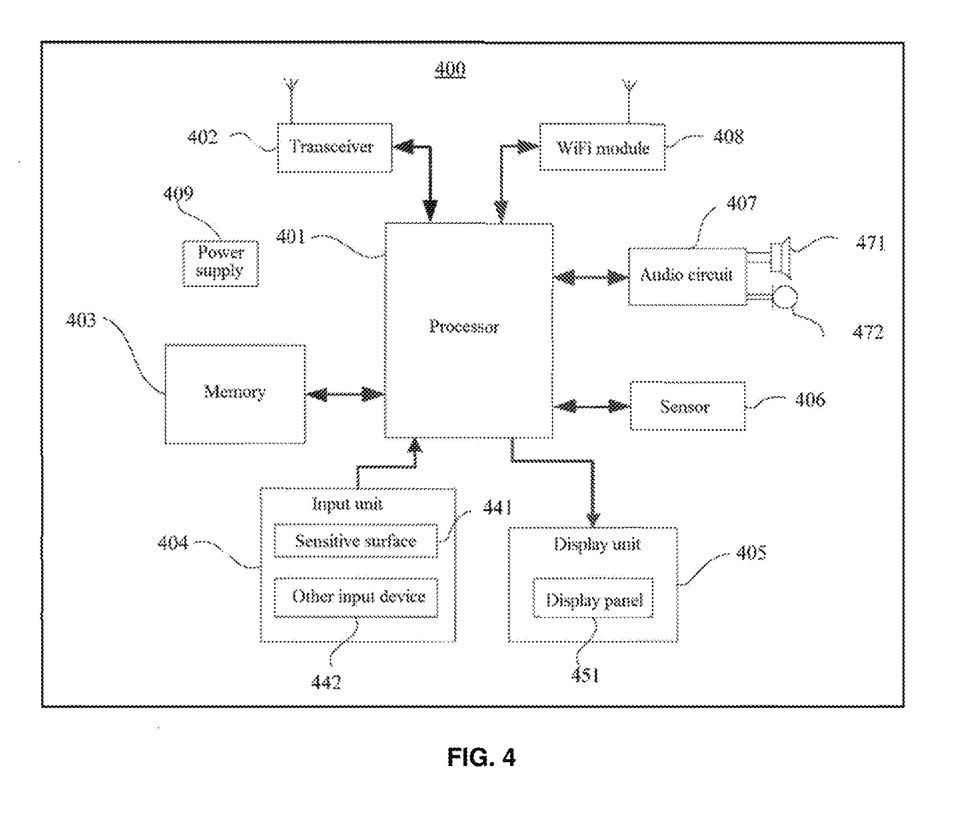
FIG. 4 is a schematic structural diagram of a terminal according to Embodiment 4 of the present disclosure.

Referring to FIG. 4, an embodiment of the present disclosure provides a terminal 400. The terminal is configured to perform the method for acquiring queuing information, and at least includes a processor 401 having one or a plurality of processing cores.

It should be noted that in addition to the processor 401, the terminal 400 further includes other components. For example, the terminal 400 may further include a transceiver 402, a memory 403, an input unit 404, a display unit 405, a sensor 406, an audio circuit 407, a wireless fidelity (WiFi) module 408 and the like components. The memory 403 includes one or more computer-readable storage media. It should be noted that a person skilled in the art may understand that the UE as illustrated in FIG. 4 does not construct any limitation on the terminal 400. The terminal may include more or fewer components than those illustrated in FIG. 2, or include a combination of some components, or employ different component deployments.

In addition, the transceiver 402 may be further configured to receive and send signals during the course of sending and receiving information or making a call, and particularly receives the downlink information from a base station, and pass the downlink information over to one or more processors 401 to process. In addition, the transceiver 402 may be further configured to send uplink data to the base station. Generally, the transceiver 402 includes, but not limited to, an antenna, at least one amplifier, a tuner, one or a plurality of oscillators, a subscriber identity module (SIM) card, a message transceiver, a coupler, a low noise amplifier (LNA), a duplexer and the like. In addition, the transceiver 402 may also communicate with other devices via wireless communication or a network. The wireless communication may employ any communication standard or protocol, including, but not limited to, global system for mobile communications (GSM), general packet radio service (GPRS), code division multiple access (CDMA), a wideband code division multiple access (WCDMA), long term evolution (LTE), electronic mail, short messaging service (SMS) and the like.

The memory 403 may be further configured to store a software program and a module; the processor 401 may execute various function applications and process data by running the software program and/or module stored in the memory 403. The memory 403 may mainly include a program memory section and data memory section, wherein the program memory area may store operation systems and application programs (for example, an audio play function, an image play function and the like) needed by at least one function; and the data memory area may store data (for example, audio data, phone book and the like) created according to the use of the terminal 400. In addition, the memory 403 may include a high speed random access memory, or include a non-transitory memory, for example, at least one disk storage device, a flash memory device, or other non-transitory solid storage device. Correspondingly, The memory 403 may further include a memory controller for the processor 401 and the input unit 404 to access the memory 403.

The input unit 404 may be configured to receive input digit or character information, and generate signal inputs from a keyboard or keypad, a mouse, a joystick, a light pen or trackball related to user settings and function control. Specifically, the input unit 404 may include a touch sensitive surface 441 and another input device 442. The touch sensitive surface 441 may also be referred to as a touch screen or a touch panel, and may collect touch operations of users thereon or therearound (for example, the operations of the users with their fingers, styluses or any suitable objects or accessories on the touch sensitive surface 441 or around the touch sensitive surface 441), and drive a corresponding connection apparatus based on a predetermined program. Optionally, the touch sensitive surface 441 may include a touch detection apparatus and a touch controller. The touch detection apparatus may be configured to detect a touch orientation of the user, detect a signal generated by a touch operation, and transmit the signal to the touch controller; and the touch controller may be configured to receive touch information from the touch detection apparatus, convert the touch information to touch point coordinates, and send the touch point coordinates to the processor 401, and may also be configured to receive a command from the processor 401 and execute the command. In addition, the touch sensitive surface 441 may be practiced by resistive, capacitive, infrared, surface acoustic wave (SAW) or other types of implementations. In addition to the touch sensitive surface 441, the input unit 404 may further include o input device 442. Specifically, the other input device 442 may include, but not limited to, one or more of a physical keyboard or keypad, a functional key (for example, a volume control key, a switch key or the like), a trackball, a mouse, a joystick and the like.

The display unit 405 may be configured to display information input by the user or information provided to the user, and various graphical user interfaces of the terminal 400. These graphical user interfaces may be formed by graphics, texts, icons, and videos or any combination thereof. The display unit 405 may include a display panel 451. Optionally, the display panel 451 may be configured by using a liquid crystal display (LCD), an organic light-emitting diode (OLED) or the like. Further, the touch sensitive surface 441 may cover the display panel 451. Upon detecting a touch operation thereon or therearound, the touch sensitive surface 441 transmits the touch operation to the processor 401 to determine the type of a touch event, such that the processor 401 provides a corresponding visual output on the display panel 451 based on the type of the touch event. Although in FIG. 4, the touch sensitive surface 441 and the display panel 451 implement the input and output functions as two independent components, in some embodiments, the touch sensitive surface 441 and the display panel 451 may also be integrated to implement the input and output functions.

The terminal 400 includes at least one sensor 406, for example, a light sensor, a motion sensor or other sensors. Specifically, the light sensor may include an ambient light sensor and a proximity sensor, wherein the ambient light sensor may be configured to adjust the luminance of the display panel 451 based on the luminance of ambient light, and the proximity sensor may be configured to turn off the display panel 451 and/or backlight when the terminal 400 is moved to an ear. As a type of motion sensor, a gravitational acceleration sensor may be configured to detect accelerations in various directions (generally three axes), and detect a magnitude and a direction of a gravitational force when the it is stationary, and may be further configured to identity applications of posture of the terminal 400 (for example, switching between horizontal screens and vertical screens, related games, or magnetometer posture calibrations), and vibration identification related functions (for example, a pedometer, or a tap). A gyroscope, a barometer, a hygrometer, a thermometer, an infrared sensor or the like sensor may also be configured in the terminal 400, which is not described herein any further.

The audio circuit 407 includes a speaker 471 and a microphone 472, wherein the speaker 471 and the microphone 472 may provide an audio interface between the user and the terminal 400. The audio circuit 407 may be configured to convert received audio data to an electrical signal, and transmit the electrical signal to speaker 471, such that the speaker 471 converts the electrical signal to an audio signal and output the audio signal. In another aspect, the microphone 472 converts a collected audio signal into an electrical signal; and the audio circuit 407 receives the electrical signal, converts the electrical signal to audio data, outputs the audio data to the processor 401 to process, and then the transceiver 402 sends the audio data to another UE by or outputs the audio data to the memory 403 for further processing. The audio circuit 407 may further comprise an earphone plug for providing communication between an external earphone and the terminal 400.

WiFi pertains to short-range wireless transmission technologies. The terminal 400 may help the user send and receive emails, browse webpages, access streaming media and the like by the WiFi module 408, which provides wireless broadband internet access to the user. Although FIG. 4 illustrates the WiFi module 408, it may be understood that the WiFi module 408 is not mandatory for the terminal 400, and the WiFi module 408 may be omitted without departing from the scope of the essence of the present disclosure according to the actual needs.

The processor 401 is a control center of the terminal 400, and connects each part of the entire UE by various interfaces and lines. The processor 401 performs various functions of the terminal 400 and processes data by running or executing software programs and/or modules stored in the memory 403 and by calling data stored in the memory 403, to implement the overall monitoring of the terminal 400. Optionally, the processor 401 may be integrated with an application processor and a modem, wherein the application processor is mainly to process an operating system, a user interface, an application program and the like, and the modem is mainly to process wireless communication. It may be understood that the modem may also not be integrated in the processor 401.

The terminal 400 may further include a power supply 409 (for example, a battery) which supplies power to various components. Preferably, the power supply 409 may be logically connected to the processor 401 via a power supply management system, such that charging, discharging, and power consumption are managed via the power supply management system. The power supply 409 may further comprise at least one DC or AC power supply, a rechargeable system, a power fault detection circuit, a power converter or inverter, a power state indicator, or the like.

Although not illustrated, the terminal 400 may further include a camera, a Bluetooth module or the like, which is not described herein any further. Specifically, in this embodiment, the processor 401 of the terminal 400 may perform the method for acquiring queuing information according to any one of the above embodiments.

An embodiment of the present disclosure provides an apparatus for acquiring queuing information, including:

a first acquiring module, configured to acquire a location and a height of each pixel point in a first video image in a world coordinate system, wherein the first video image is a video image captured by a video camera at a queue area;

a first determining module, configured to determine a behavior state of each human body at the area based on the location and the height of the each pixel point; and a second acquiring module, configured to acquire queuing information based on the behavior state of each human body at the area at a current time.

Optionally, the first determining module includes:

a first acquiring unit, configured to acquire a location of each human body at the area at the current time based on the location and the height of the each pixel point; and a first determining unit, configured to determine the behavior state of each human body at the area at the current time based on a location of each human body at the area at a first time and the location of each human body at the area at the current time, wherein the first time is prior to the current time and away from the current time by a predetermined time threshold.

Optionally, the first acquiring module includes:

a second acquiring unit, configured to acquire the first video image captured by the video camera; and a third acquiring unit, configured to, based on coordinates of each pixel point in the first video image in an image coordinate system, acquire the location and the height of the each pixel point in the world coordinate system by a predetermined transform matrix.

Optionally, the first acquiring module is further configured to:

acquire a depth image corresponding to the first video image based on the height of each pixel point in the first video image;

identify, in the depth image, a location of a head image of each human body in the depth image in the image coordinate system; and based on the location of the head image of each human body in the image coordinate system, acquire the location of the human body corresponding to the head image of each human body at the area at the current time by a predetermined transform matrix.

Optionally, the first acquiring module is further configured to:

replace a pixel value of each pixel point in the first video image with the height of each pixel point to obtain the depth image; or based on the location of each pixel point in the first video image, fill the height of each pixel point in the first video image in a blank image to obtain the depth image.

Optionally, the first determining module is further configured to:

calculate a movement speed of each human body at the area at the current time based on the location of each human body at the area at the first time, the location of each human body at the area at the current time, and a time interval between the first time and the current time; and set a behavior state of the human body with the movement speed exceeding a predetermined speed threshold as a traveling state, and set a behavior state of the human body with the movement speed not exceeding the predetermined speed threshold as a queuing state.

Optionally, the second acquiring module includes:

a second determining unit, configured to, based on the location of each human body in a queue set, determine a queue region where each human body is located in the queue set at the area at the current time, wherein the queuing set comprises human bodies in a queuing state at the area at the current time; and a fourth acquiring unit, configured to acquire the queuing information at the area at the current time based on the determined queue region.

Optionally, the second acquiring module includes:

a fifth acquiring unit, configured to determine a region occupied by each human body at the area at the current time based on the location and the height of each pixel point; and the apparatus further includes:

a second determining module, configured to determine at least one queue region at the area at the current time based on the region occupied by each human body at the area at the current time.

Optionally, the second determining module includes:

an adjusting unit, configured to increase a weight corresponding to the region occupied by each human body in the queuing state, and decrease weights of other regions;

a selecting unit, configured to select a region with the weight exceeding a predetermined weight threshold from the regions at the area; and a second determining unit, configured to determine at least one connected region in the selected region, where each of the at least one communication region is a queue region.

Optionally, the apparatus further includes:

a modifying module, configured to: determine a first human body and a queue region where the first human body is located at the first time, where a behavior state of the first human body at the current time is the traveling state and a behavior state of the first human body at the first time is the queuing state; and modify the behavior state of the first human body to the queuing state and add the behavior state of the first human body to the queue set, if a location of the first human body at the current time is in the determined queue region.

Optionally, the apparatus further includes:

a third determining module, configured to determine the behavior state at the first time as the queuing state and determine a human body that does not appear at the area at the current time as a human body that disappear exceptionally, and add the human body that disappears exceptionally to a queue of the human bodies that disappear exceptionally;

wherein the fourth acquiring unit is further configured to: count the number of first human bodies in the queuing state in the queue region; count the number of human bodies, that disappear exceptionally in the queue region, in the queue of human bodies that disappear; and calculate a sum of the number of first human bodies and the number of the human bodies that disappear exceptionally to obtain the number of queuing human bodies in the queue region.

Optionally, the apparatus further includes:

a fourth determining module, configured to: determine; and delete the human body that appears exceptionally from the queue of the human bodies that disappear if the queue of the human bodies that disappear comprises the human body that appears exceptionally.

In the embodiment of the present disclosure, the location and the height of each pixel in the first video image captured by a video camera in the world coordinate system; the behavior state of each human body at the area is determined based on the location and the height of each pixel; the queuing information may be acquired based on the behavior state of each human body. In this way, the queuing information may be acquired by deploying only one video camera at the entire area, and thus the cost is lowered.

Persons of ordinary skill in the art should understand that all or part of steps of the preceding methods may be implemented by hardware or the related hardware instructed by programs. The programs may be stored in a non-transitory computer-readable storage medium, and may be executed by at least one processor. The storage medium may be a read only memory, a magnetic disk, or a compact disc.

The foregoing descriptions are merely preferred embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A method for acquiring queuing information, comprising:
   acquiring a location and a height of each pixel point in a first video image in a world coordinate system, wherein the first video image is a video image captured by a video camera at a queue area;
   determining a behavior state of each human body at the area based on the location and the height of the each pixel point; and
   acquiring queuing information based on the behavior state of each human body at the area at a current time,
   wherein determining a behavior state of each human body at the area based on the location and the height of the each pixel point comprises:
      acquiring a location of each human body at the area at the current time based on the location and the height of the each pixel point; and
      determining the behavior state of each human body at the area at the current time based on a location of each human body at the area at a first time and the location of each human body at the area at the current time, the first time being prior to the current time and away from the current time by a predetermined time threshold,
   wherein determining the behavior state of each human body at the area at the current time based on a location of each human body at the area at a first time and the location of each human body at the area at the current time comprises:
      calculating a movement speed of each human body at the area at the current time based on the location of each human body at the area at the first time, the location of each human body at the area at the current time, and a time interval between the first time and the current time; and
      setting a behavior state of the human body with the movement speed exceeding a predetermined speed threshold as a traveling state, and setting a behavior state of the human body with the movement speed not exceeding the predetermined speed threshold as a queuing state, and
   wherein the queuing information comprises a number of queuing people.

2. The method according to claim 1, wherein acquiring a location and a height of each pixel point in a first video image in a world coordinate system comprises:
   acquiring the first video image captured by the video camera; and
   based on coordinates of each pixel point in the first video image in an image coordinate system, acquiring the location and the height of each pixel point in the world coordinate system by a predetermined transform matrix.

3. The method according to claim 1, wherein acquiring a location of each human body at the area at a current time based on the location and the height of the each pixel point comprises:
   acquiring a depth image corresponding to the first video image based on the height of each pixel point in the first video image;
   identifying, in the depth image, a location of a head image of each human body in the depth image in the image coordinate system; and
   based on the location of the head image of each human body in the image coordinate system, acquiring the location of the human body corresponding to the head image of each human body at the area at the current time by a predetermined transform matrix.

4. The method according to claim 3, wherein acquiring a depth image corresponding to the first video image based on the height of each pixel point in the first video image comprises one of followings:
   obtaining the depth image by replacing a pixel value of each pixel point in the first video image with the height of the each pixel point respectively; and
   obtaining, based on the location of each pixel point in the first video image, the depth image by filling the height of the each pixel point in the first video image in a blank image.

5. The method according to claim 1, wherein acquiring queuing information based on the behavior state of each human body at the area comprises:
   based on the location of each human body in a queue set, determining a queue region of each human body in the queue set at the area at the current time, the queue set comprising human bodies in the queuing state at the area at the current time; and
   acquiring the queuing information at the area at the current time based on the determined queue region.

6. The method according to claim 5, wherein upon acquiring a location and a height of each pixel point in a first video image in a world coordinate system, the method further comprises:
   determining a region occupied by each human body at the area at the current time based on the location and the height of each pixel point; and
   prior to the determining a queue region of each human body in the queue set at the area at the current time, the method further comprises:
   determining at least one queue region at the area at the current time based on the region occupied by each human body at the area at the current time.

7. The method according to claim 6, wherein determining at least one queue region at the area at the current time based on the region occupied by each human body at the area at the current time comprises:
   increasing a weight corresponding to the region occupied by each human body in the queuing state, and decreasing weights of other regions;
   selecting a region with the weight exceeding a predetermined weight threshold from the regions at the area; and
   determining at least one connected region in the selected region, wherein each of the at least one connected region is a queue region.

8. The method according to claim 5, wherein prior to determining a queue region, where each human body is located, in the queue set at the area at the current time, the method further comprises:

determining a first human body and a queue region where the first human body is located at the first time, wherein a behavior state of the first human body at the current time is the traveling state and a behavior state of the first human body at the first time is the queuing state; and modifying the behavior state of the first human body to the queuing state and adding the behavior state of the first human body to the queue set, if a location of the first human body at the current time is in the determined queue region.

9. The method according to claim 5, wherein upon determining a behavior state of each human body at the area based on the location and the height of the each pixel point, the method further comprises:

determining a human body that had the queuing state as the behavior state at the first time and does not appear at the area at the current time as a human body that disappears exceptionally, and adding the human body that disappears exceptionally to a queue of human bodies that disappear; and acquiring the queuing information at the area at the current time based on the determined queue region comprises:

counting a number of first human bodies in the queue region;

counting a number of the human bodies that disappear exceptionally from the queue region in the queue of human bodies that disappear; and calculating a sum of the number of first human bodies and the number of the human bodies that disappear exceptionally to obtain the number of the queuing human bodies in the queue region.

10. The method according to claim 9, wherein upon determining a behavior state of each human body at the area based on the location and the height of each pixel point, the method further comprises:

determining a human body that had the queuing state as the behavior state at the first time and does not appear at the area at the current time as a human body that disappears exceptionally, and adding the human body that disappears exceptionally to a queue of human bodies that disappear; and deleting the human body that disappears exceptionally from the queue of the human bodies that disappear if the queue of the human bodies that disappear comprises the human body that disappears exceptionally.

11. An apparatus for acquiring queuing information, comprising:

at least one processor; and at least one memory;

wherein the at least one memory stores one or a plurality of programs, the one or plurality of programs is configured to be executed by the at least one processor, to execute following instructions:

acquiring a location and a height of each pixel point in a first video image in a world coordinate system wherein the first video image is a video image captured by a video camera at a queue area;

determining a behavior state of each human body at the area based on the location and the height of the each pixel point; and acquiring queuing information based on the behavior state of each human body at the area at a current time, wherein determining a behavior state of each human body at the area based on the location and the height of the each pixel point comprises:

acquiring a location of each human body at the area at the current time based on the location and the height of the each pixel point; and determining the behavior state of each human body at the area at the current time based on a location of each human body at the area at a first time and the location of each human body at the area at the current time, the first time being prior to the current time and away from the current time by a predetermined time threshold, wherein determining the behavior state of each human body at the area at the current time based on a location of each human body at the area at a first time and the location of each human body at the area at the current time comprises:

calculating a movement speed of each human body at the area at the current time based on the location of each human body at the area at the first time, the location of each human body at the area at the current time, and a time interval between the first time and the current time; and setting a behavior state of the human body with the movement speed exceeding a predetermined speed threshold as a traveling state, and setting a behavior state of the human body with the movement speed not exceeding the predetermined speed threshold as a queuing state, and wherein the queuing information comprises a number of queuing people.

12. The apparatus according to claim 11, wherein acquiring a location and a height of each pixel point in a first video image in a world coordinate system comprises:

acquiring the first video image captured by the video camera; and based on coordinates of each pixel point in the first video image in an image coordinate system, acquiring the location and the height of each pixel point in the world coordinate system by a predetermined transform matrix.

13. The apparatus according to claim 11, wherein acquiring a location of each human body at the area at a current time based on the location and the height of the each pixel point comprises:

acquiring a depth image corresponding to the first video image based on the height of each pixel point in the first video image;

identifying, in the depth image, a location of a head image of each human body in the depth image in the image coordinate system; and based on the location of the head image of each human body in the image coordinate system, acquiring the location of the human body corresponding to the head image of each human body at the area at the current time by a predetermined transform matrix.

14. The apparatus according to claim 11, wherein acquiring queuing information based on the behavior state of each human body at the area comprises:

based on the location of each human body in a queue set, determining a queue region of each human body in the queue set at the area at the current time, the queue set comprising human bodies in the queuing state at the area at the current time; and acquiring the queuing information at the area at the current time based on the determined queue region.

15. The apparatus according to claim 14, wherein prior to determining a queue region, where each human body is located, in the queue set at the area at the current time, the method further comprises:
   determining a first human body and a queue region where the first human body is located at the first time, wherein a behavior state of the first human body at the current time is the traveling state and a behavior state of the first human body at the first time is the queuing state; and
   modifying the behavior state of the first human body to the queuing state and adding the behavior state of the first human body to the queue set, if a location of the first human body at the current time is in the determined queue region.

16. The apparatus according to claim 14, wherein upon determining a behavior state of each human body at the area based on the location and the height of the each pixel point, the method further comprises:
   determining a human body that had the queuing state as the behavior state at the first time and does not appear at the area at the current time as a human body that disappears exceptionally, and adding the human body that disappears exceptionally to a queue of human bodies that disappear; and
   acquiring the queuing information at the area at the current time based on the determined queue region comprises:
   counting a number of first human bodies in the queue region;
   counting a number of the human bodies that disappear exceptionally from the queue region in the queue of human bodies that disappear; and
   calculating a sum of the number of first human bodies and the number of the human bodies that disappear exceptionally to obtain the number of the queuing human bodies in the queue region.

17. A non-transitory computer-readable storage medium, wherein the non-transitory computer-readable storage medium is configured to store a computer program and the computer program is loaded by a processor to execute instructions for performing to execute following instructions:
   acquiring a location and a height of each pixel point in a first video image in a world coordinate system wherein the first video image is a video image captured by a video camera at a queue area;
   determining a behavior state of each human body at the area based on the location and the height of the each pixel point; and
   acquiring queuing information based on the behavior state of each human body at the area at a current time,
   wherein determining a behavior state of each human body at the area based on the location and the height of the each pixel point comprises:
      acquiring a location of each human body at the area at the current time based on the location and the height of the each pixel point; and
      determining the behavior state of each human body at the area at the current time based on a location of each human body at the area at a first time and the location of each human body at the area at the current time, the first time being prior to the current time and away from the current time by a predetermined time threshold,
   wherein determining the behavior state of each human body at the area at the current time based on a location of each human body at the area at a first time and the location of each human body at the area at the current time comprises:
      calculating a movement speed of each human body at the area at the current time based on the location of each human body at the area at the first time, the location of each human body at the area at the current time, and a time interval between the first time and the current time; and
      setting a behavior state of the human body with the movement speed exceeding a predetermined speed threshold as a traveling state, and setting a behavior state of the human body with the movement speed not exceeding the predetermined speed threshold as queuing state,
   wherein the queuing information comprises a number of queuing people.

18. The apparatus according to claim 14, wherein upon acquiring a location and a height of each pixel point in a first video image in a world coordinate system, the method further comprises:
   determining a region occupied by each human body at the area at the current time based on the location and the height of each pixel point; and
   prior to the determining a queue region of each human body in the queue set at the area at the current time, the method further comprises:
   determining at least one queue region at the area at the current time based on the region occupied by each human body at the area at the current time.

19. The apparatus according to claim 16, wherein upon determining a behavior state of each human body at the area based on the location and the height of each pixel point, the method further comprises:
   determining a human body that had the queuing state as the behavior state at the first time and does not appear at the area at the current time as a human body that disappears exceptionally, and adding the human body that disappears exceptionally to a queue of human bodies that disappear; and
   deleting the human body that disappears exceptionally from the queue of the human bodies that disappear if the queue of the human bodies that disappear comprises the human body that disappears exceptionally.

20. The computer-readable storage medium according to claim 18, wherein determining at least one queue region at the area at the current time based on the region occupied by each human body at the area at the current time comprises:
   increasing a weight corresponding to the region occupied by each human body in the queuing state, and decreasing weights of other regions;
   selecting a region with the weight exceeding a predetermined weight threshold from the regions at the area; and
   determining at least one connected region in the selected region, wherein each of the at least one connected region is a queue region.

* * * * *

UNITED STATES PATENT AND TRADEMARK OFFICE
CERTIFICATE OF CORRECTION

Page 1 of 1

| | |
|---|---|
| PATENT NO. | : 11,158,035 B2 |
| APPLICATION NO. | : 16/563632 |
| DATED | : October 26, 2021 |
| INVENTOR(S) | : Liu |

It is certified that error appears in the above-identified patent and that said Letters Patent is hereby corrected as shown below:

In the Drawings

On Sheet 2 of 4, FIG. 2-1, Line 1, Reference Number 205, delete "Detremining" and insert --Determining--.

In the Specification

In Column 15, Line 39 (Approx.), delete "in in" and insert --in--.

In the Claims

In Column 28, Claim 17, Line 20 (Approx.), delete "as" and insert --as a--.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*